United States Patent
Hartmann et al.

(10) Patent No.: US 8,524,145 B2
(45) Date of Patent: Sep. 3, 2013

(54) METHOD AND DEVICE FOR INTRODUCING DUST INTO A METAL MELT OF A PYROMETALLURGICAL INSTALLATION

(75) Inventors: Werner Hartmann, Weisendorf (DE); Günter Lins, Erlangen (DE); Thomas Matschullat, Eckental (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/207,512

(22) Filed: Aug. 11, 2011

(65) Prior Publication Data
US 2011/0291333 A1   Dec. 1, 2011

Related U.S. Application Data

(63) Continuation of application No. 12/308,607, filed as application No. PCT/EP2007/055448 on Jun. 4, 2007, now Pat. No. 8,029,594.

(30) Foreign Application Priority Data

Jun. 28, 2006  (DE) .......................... 10 2006 029 725

(51) Int. Cl.
*C21C 7/00*  (2006.01)

(52) U.S. Cl.
USPC ............................................ 266/216; 266/234

(58) Field of Classification Search
USPC ........................ 266/216, 234, 44, 45
See application file for complete search history.

(56) References Cited

U.S. PATENT DOCUMENTS

| | | | |
|---|---|---|---|
| 3,275,408 A * | 9/1966 | Winterburn | 423/337 |
| 4,853,250 A | 8/1989 | Boulos | |
| 6,693,253 B2 * | 2/2004 | Boulos et al. | 219/121.52 |
| 2005/0183542 A1 | 8/2005 | Han | |

FOREIGN PATENT DOCUMENTS

| | | |
|---|---|---|
| DE | 3042276 C2 | 7/1985 |
| DE | 10231739 A1 | 1/2004 |
| EP | 0465422 A2 | 1/1992 |
| GB | 2014615 A | 8/1979 |
| RU | 2004113558 A | 4/2005 |
| SU | 1094569 A1 | 9/1992 |

* cited by examiner

*Primary Examiner* — Scott Kastler

(57) ABSTRACT

A device for introducing dust into a molten bath of a pyrometallurgical installation is provided. An electrodeless plasma torch includes an essentially tubular housing, wherein the housing allows a passage of a carrier gas containing dust particles, and wherein the housing is coaxially surrounded by an inductive load coil which forms a heating zone.

4 Claims, 1 Drawing Sheet

METHOD AND DEVICE FOR INTRODUCING DUST INTO A METAL MELT OF A PYROMETALLURGICAL INSTALLATION

CROSS REFERENCE TO RELATED APPLICATIONS

This application is a continuing application of U.S. non-provisional application Ser. No. 12/308,607 filed Dec. 18, 2008 now U.S. Pat. No. 8,029,594, which is the U.S. national stage of International application no. PCT/EP2007/055448 filed Jun. 4, 2007, and claims the benefit thereof. The International application claims the benefits of German application no. 10 2006 029 725.3 DE filed Jun. 28, 2006. All of the applications are incorporated by reference herein in their entirety.

FIELD OF INVENTION

The claimed invention relates to a method and a device for blowing dust into a metal melt of a pyrometallurgical installation. The dust involved in such cases is above all that which arises in the metallurgical industry, during steel production for instance, and has metallic and other, e.g. oxidic components. This dust is sometimes stored in landfill sites, but is however also used in many instances during the manufacture of metal. To this end, it is known with different methods to use the dust in briquette form. With a Thyssen Krupp method (Oxycup method), dust is processed to form cement-like stones, which are used in a shaft furnace. In addition, dust is also blown in during steel scrap melting in arc furnaces for instance. However, this mostly results in the process deteriorating, in particular in instabilities in the arc furnace. In general terms, the dust has a cooling effect on the slag, as a result of which the necessary foaming of the slag is reduced or completely eliminated. Dust can thus often only be supplied in a limited quantity.

SUMMARY OF INVENTION

An object of the claimed invention is to provide a device for introducing dust into a metal melt of a pyrometallurgical installation.

This object is achieved by a device as claimed in the independent claims.

A carrier gas containing dust particles is routed through the plasma generated in the heating zone of an electrodeless inductively coupled plasma torch, prior to then being blown into a region of an installation which receives the metal melt. In the plasma, the carrier gas is for its part converted into the plasma state. By interacting with the surrounding plasma, the dust particles introduced with the carrier gas are heated up to a temperature, which is greater than or equal to the temperature of the metal melt or slag. As a result of the absence of electrodes for the generation of the plasma, long service lives are achieved, since neither an electrode burnout nor a mechanical impairment of the electrodes is caused by the dust particles flowing through the plasma torch. It is also advantageous for the reactive gases, such as oxygen, to be able to be blown in, without risking chemically damaging the electrodes. It is also advantageous if the exclusively inductive heating of the plasma of the metallurgical region of an installation and the plasma flame are electrically decoupled from one another, so that a considerably better control of the individual method steps can be achieved. As the process gas and the dust particles contained therein are practically heated up to the process temperature, a cooling down of the slag is prevented. In contrast to the arc method, the occurrence of arc instabilities is also prevented.

The plasma is controlled in a preferred method variant such that the dust particles convert into the liquid or gaseous state. As a result, a very homogenous mixing with the metal melt is ensured. The condensation or evaporation of oxidic dust particles allow high temperatures to be anticipated with a good reaction kinetic. Dust containing chromium and/or Cr—VI and $Cr_2O_3$ can be reduced for instance in order to increase the production of chrome for environmental protection reasons. The reduction of dust is also advantageous during the manufacture of high-grade steel. A further exemplary application is the reduction of Al—Zn dross, in other words Al and Zn oxide, which accumulates during the respective manufacturing process.

The carrier gas containing dust is preferably axially routed through load coil surrounding the heating zone of the plasma torch. With a particularly preferred method variant, a carrier gas loaded with dust particles and a dust-free gas required for plasma generation is fed to the heating zone via a coaxial injection tube and via a gas delivery tube which coaxially surrounds the injection tube respectively. As a result, the gas and particle streams can be controlled separately and stable plasma can be generated in this way.

With a further preferred method variant, the carrier gas is routed through a preheating zone arranged upstream of the heating zone and formed by a preheating coil with a weaker power. In the preheating zone, the carrier gas is pre-ionized and the dust particles transported therein are preheated to such a degree that an excessive cooling or an extinction of the plasma in the heating zone of the load coil is avoided. This ensures that impedance fluctuations in the plasma-filled load coil remain minimal and a high power high frequency generator operated hereon can always be operated within a favorable performance range. Without the preheating zone, there is the risk that an excessively low ionized plasma is present in the heating zone or that the existing plasma expires so that a high terminating impedance with a correspondingly high power reflection prevails, which may result in instable behavior of the high frequency circuit until it becomes damaged. The mentioned high frequency generator can thus be designed for the optimum region with the maximum level of efficiency. The unfavorable operating range, which is needed for a plasma ignition, is avoided as a result.

A device which is suited to implementing the described method which can be advantageously applied to the manufacture and processing of steel includes an electrodeless plasma torch with an essentially tubular housing used to allow the passage of a carrier gas containing dust particles, said housing being coaxially surrounded by an inductive load coil forming a heating zone. As already mentioned above, electrodes for generating an arc are not needed so that the device is embodied in a correspondingly simple fashion and requires little maintenance.

The device preferably has an injection tube which protrudes coaxially into the housing on the one side. A carrier gas containing dust particles can be fed to the heating zone of the plasma torch by way of said injection tube, with the supply tube expediently extending approximately to the heating zone. The injection tube is coaxially surrounded by a gas delivery tube, with a hollow cylindrical annular channel being present between the injection tube and sheath and/or housing in each instance. The gas referred to below as plasma gas is routed through the annular channel bordering the injection tube, said gas being required to generate plasma in the heating zone of the load coil. The annular channel arranged radially outwards is charged with a gas referred to below as sheathing gas, which is used to cool the housing and at the same time contributes to plasma generation in the heating zone of the load coil.

The preheating zone already described above is preferably formed by a preheating coil which coaxially surrounds the supply tube.

BRIEF DESCRIPTION OF THE DRAWINGS

The claimed invention is now described in more detail with reference to the appended schematic drawings, in which;

DETAILED DESCRIPTION OF INVENTION

Figure 1:
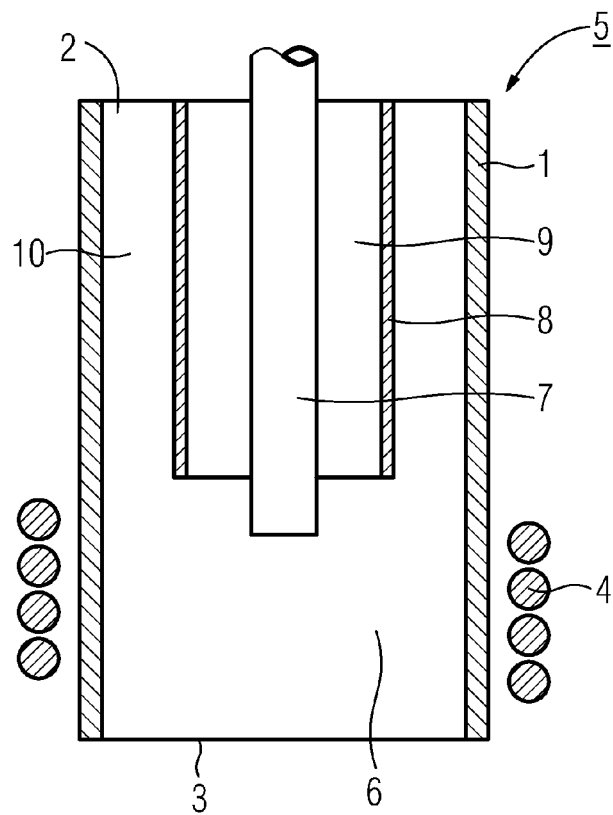
FIG. 1 shows a first exemplary embodiment of a device, which only has a heating zone

The devices shown in cross section in the Figures include an electrodeless plasma torch 5 with a housing 1 which is essentially embodied as a tubular section, and consist of a ceramic material, for instance silicon nitride. This has an inlet opening 2 and an outlet opening 3. The housing is coaxially surrounded by a load coil 4 adjacent to the outlet opening 3, said load coil being connected to a high power high frequency generator (not shown) in order to generate a magnetic alternating field. The load coil forms a heating zone 6, in which a carrier gas containing dust particles as well as the plasma gas flowing through the annular channel between the injection tube 7 and the gas delivery tube 8 and also the sheathing gas flowing between the gas delivery tube 8 and the housing 1 are converted into the plasma state. Here temperatures are reached which corresponds to at least those of an electric arc of a conventional plasma torch. The electrical power supply is effected by way of a high power high frequency generator with a continuous output typically ranging between 10 kW to 50 MW and an oscillating frequency which typically ranges between 100 kHz to 5 kHz. The magnetic alternating field of the load coil 4 induces an electrical field with such a high field intensity in the heating zone 6 that it results in a gas breakthrough with the following ionization of the carrier gas, the plasma gas and the sheathing gas. Once the heating zone 6 is filled with plasma of sufficiently high conductance, the high frequency electrical alternating field in the plasma induces a high frequency current, which leads to an intensive heating of the plasma. Here, electrical efficiency levels above 50% for the plasma heating can be achieved, with powers of up to some 100 kW. The plasma in the heating zone 6 can, depending on the electrical power supplied, reach temperatures which allow high-melting materials, such as metal oxides and nitrates, to melt.

An injection tube 7 protrudes into the housing on the inlet side and extends to and terminates at the heating zone 6. This has a significantly smaller diameter and/or cross-section of flow than the housing 1. A carrier gas containing a dust particle is fed to a central region of the heating zone 6 by way of the injection tube 7. The injection tube 7 is coaxial and surrounded at a radial distance by a gas delivery tube 8, with an annular channel 9 remaining free between the injection tube 7 and the gas delivery tube 8. A dust-free gas (plasma gas) serving to generate plasma is routed herethrough. The diameter of the gas delivery tube 8 is measured such that an annular channel 10 also remains free between it and the housing 1. This is used to supply cooling gas, for instance air, in order to protect the ceramic housing 1 against an excessively strong thermal influence.

Figure 2:
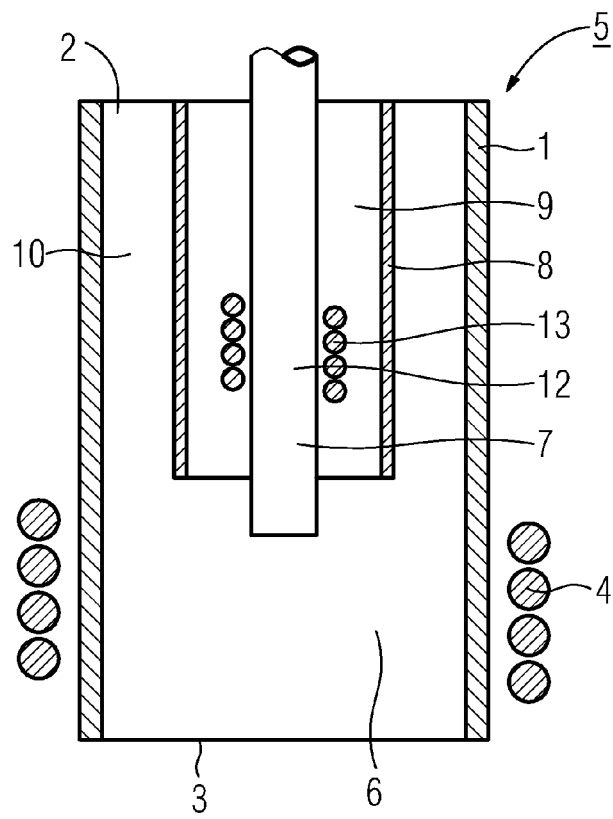
FIG. 2 shows a device in a representation corresponding to FIG. 1, which has an additional heating zone, namely a preheating zone.

The device shown schematically in FIG. 2 essentially differs from that in FIG. 1 in that a preheating zone 12 is arranged upstream of a heating zone. This is formed by a preheating coil 13, which coaxially surrounds the injection tube 7 in a region arranged within the gas delivery tube 8. The preheating coil has an essentially lower power than the load coil 4. It accordingly generates a plasma with a lower ion density, which however, if it is fed to the central region of the heating zone 6, prevents larger impedance fluctuations of the load coil 4, as was already described in detail above.

The invention claimed is:

1. A device for blowing dust into a metal melt of a pyrometallurgical installation, comprising:
   an electrodeless plasma torch with an essentially tubular housing,
   wherein an injection tube protrudes centrally into the housing on an inlet side,
   wherein the injection tube is coaxially surrounded by a gas delivery tube,
   wherein the housing allows a passage of a carrier gas containing dust particles,
   wherein the housing is coaxially surrounded by an inductive load coil which forms a heating zone,
   wherein an inductive preheating zone is arranged upstream of the heating zone,
   wherein the inductive preheating zone is formed by a preheating coil located within the gas delivery tube, coaxially surrounding the injection tube.

2. The device as claimed in claim 1, wherein the injection tube extends to the heating zone.

3. The device as claimed in claim 1, wherein an annular channel is provided between the injection tube and the gas delivery tube.

4. The device as claimed in claim 1, wherein an annular channel is provided between the injection tube and the housing.

* * * * *